United States Patent

Safko, Jr. et al.

[15] 3,653,491

[45] Apr. 4, 1972

[54] CONVEYOR CHAIN AND CONTROL METHOD

[72] Inventors: John Safko, Jr., 419 McLelland Road, Canonsburg, Pa. 15317; Glenn S. McDowell, 601 Wylie Avenue, Franklin, Pa. 16326

[22] Filed: Aug. 19, 1970

[21] Appl. No.: 65,269

Related U.S. Application Data

[63] Continuation of Ser. No. 684,166, Nov. 20, 1967, abandoned, which is a continuation of Ser. No. 670,360, Sept. 25, 1967, abandoned.

[52] U.S. Cl. ..........................................................198/171
[51] Int. Cl. ........................................................B65g 19/00
[58] Field of Search .......................... 198/171, 176, 109, 117

[56] References Cited

UNITED STATES PATENTS

| 1,904,167 | 4/1933 | Redler | 198/171 |
| 1,917,134 | 7/1933 | Levin | 198/177 |
| 2,667,263 | 1/1954 | Bigler | 198/171 |

*Primary Examiner*—Richard E. Aegerter
*Attorney*—E. Wallace Breisch

[57] ABSTRACT

A flight conveyor chain having plurality of links between flight sections, such links being flexible in a direction normal to the plane of the flights, and the chain having a universal link intermediate of the flight sections which is flexible in the direction parallel to the plane of the flights.

6 Claims, 3 Drawing Figures

Patented April 4, 1972
3,653,491
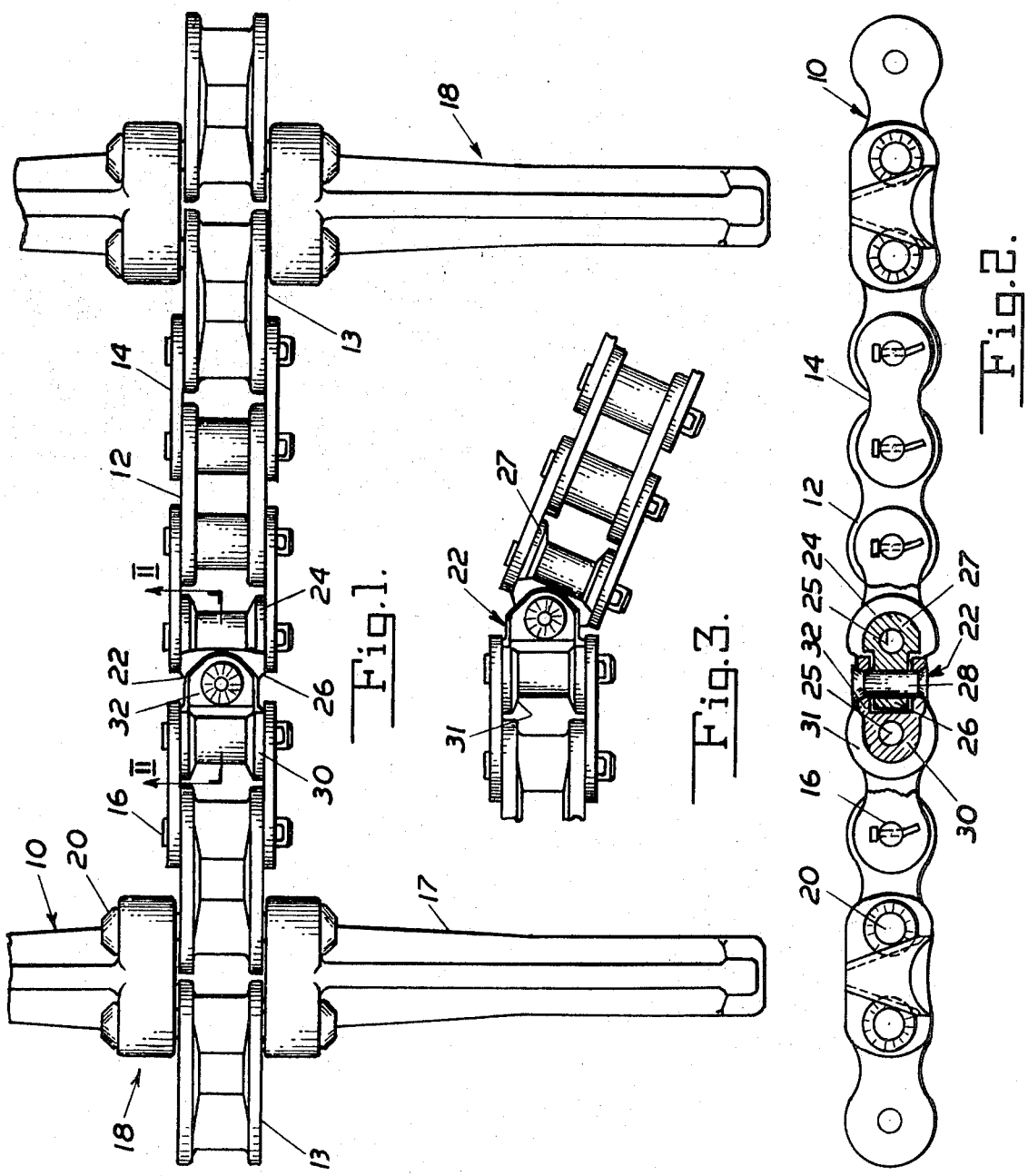
INVENTORS
Glenn S. McDowell.
John Safko Jr.

CONVEYOR CHAIN AND CONTROL METHOD

This application is a continuation of application serial number 684,166 filed Nov. 20, 1967, now abandoned, which is a continuation of application number 670,360 filed Sept. 25, 1967, now abandoned, and as such claims the benefit of a filing date of Sept. 25, 1967 under 35 U.S.C. 120.

This invention relates to a flight conveyor and more particularly to a chain for a flight conveyor of the type extensively used in mining machines and coal loaders such as those more completely described and shown in U.S. Pat. No. 3,225,897. In such machines an elongated conveyor chain trained about spaced rollers or sprockets for orbital movement thereabouts is provided at spaced intervals with laterally extending flight bars or scraper flights which cooperate with a substantially planar deck surface to move material therealong. The necessary vertical flexibility for passing the chain over rollers or sprockets is provided by having links of the chain hingedly connected for flexing about an axis parallel to the deck surface with which the chain cooperates and such chains, formed of a series of roller links and connecting links, are well known in the mechanical arts. In the case of mining machines and loaders, as well as many other machines, it is necessary that the chain not only have vertical flexibility but because different portions of the machine are swingable with relation to each other, substantially in the plane of the decks, a flight conveyor chain for such use must have limited horizontal flexibility about an axis normal to the plane of the deck. Where maximum horizontal flexibility was required, prior art devices have incorporated a universal joint in each of the roller links or have alternated links flexible in the two directions, respectively, to accomplish such universal flexibility. Where only limited horizontal flexibility has been required, prior art machines have incorporated a universal joint in the roller link adjacent each side of each flight section, respectively, with the remaining links being only vertically flexible. Such prior art devices have served the purpose of providing great flexibility in a direction normal to the deck and limited flexibility in the direction parallel to the deck but have not been entirely satisfactory for the following reasons:

The presence of a universal joint on each side of the flight results in undesirable instability of the flight in the direction of travel particularly under unequal loading of the two arms of the flight;

In the case of welded flight construction the universal becomes an integral part of the flight section and excessive wear and damage to the universal link necessitates replacement of a whole flight section at considerable expense;

The use of a universal link on each side of the flight section fixes the number of universal joints as two per flight section throughout the chain.

In the conveyor chain of the present invention only roller links are employed in flight section construction while the universal flexing action necessary for the desired flexibility in the direction parallel to the plane of the deck is provided by a single universal link positioned between roller links intermediate of the flight sections and giving rise to the following advantages;

The flexibility of the chain parallel to the deck is greatly reduced so that the angular relationship between successive flight members is controlled even when the flight arms of a single flight member are unequally loaded.

The number of universal links is only half that of the prior art conveyor chains;

In case of excessive wear or breakage of a universal link such a link may be readily replaced even where welded flight units are being used without necessitating replacement of the flight section.

These and other advantages resident in the conveyor chain of this invention will become more readily apparent upon consideration of the following description and drawings in which:

FIG. 1 is a fragmentary top plan view of a flight conveyor chain constructed according to the principles of this invention;

FIG. 2 is a side elevational view of the conveyor chain of FIG. 1, having a sectional view portion taken substantially on line 2—2 of FIG. 1 looking in the direction indicated by the arrows; and FIG. 3 is a top elevational view of a portion of the chain shown in FIG. 1 but with components in different angular relation to each other to show the horizontal flexibility inherent in a universal joint link.

In FIG. 1 there is shown a portion of an elongated conveyor chain, generally indicated at 10, constructed according to the principles of this invention and comprising a plurality of longitudinally spaced, regular roller links 12 and flight section roller links 13 connected seriatim by intervening connecting links 14 flexibility secured thereto by link pins 16 suitable secured in mating bores in the roller links 12, 13 and connecting links 14, respectively, all as well known in the art. At spaced intervals along the chain, a connecting link 14 is omitted and a pair of laterally extending flights 17 are substituted for a connecting link 14 by the use of flight pins 20 secured in the flights 17 by welding or other means. Flight pins 20 are rotatably received in the bores of a pair of flight section roller links 13 as well known in the formation of a flight member or flight section 18 of the flight conveyor chain 10. Such construction gives the chain 10 vertical flexibility suitable for being driven in an orbital path and trained about rollers or sprockets at each end of the orbit in the formation of a working strand, moving along an upper surface of a supporting deck (not shown), and a return strand of chain in the usual manner.

It is to be noted that the phrases vertical flexibility and horizontal flexibility, as herein applied, have meaning only with relation to a substantially flat, chain supporting surface, such as a deck, wherein vertical flexibility is to be taken as indicating that adjacent members are rotatable relative to each other about an axis parallel to such a surface while horizontal flexibility indicates such members are rotatable relative to each other about an axis normal to such a surface.

At least one point intermediate between the flight sections 18 the place of one of the roller links 12 is taken by a universal link 22. The universal link 22 comprises a male member 24 (see FIG. 2) having a generally cylindrical base portion 27 similar to one half of a roller link and containing a bore 25 rotatably receiving a link pin 16 to flexibly connect the male member 24 to a connecting link 14. The other half of the universal link 22 comprises a female member 30 having a base portion 31 formed in the same manner, with a bore 25, and secured to another connecting link 14 in the same manner as the male base portion 27 above described. Extending outwardly along one side of the male member base portion 27 is a generally rectangular tongue portion 26 received within, and mating with, a groove portion 32 extending outwardly along the base portion 31 of the female member 30. Mating bores in the tongue portion 26 and the groove portion 32, having a common axis normal to the plane of the axes of bores 25, are occupied by a cylindrical pin 28 rotatably received in the bore of the tongue portion 26 and rigidly secured in the mating bores of the groove portion 32 in a suitable manner as by heading and/or welding.

The universal link 22 is thus designed to maintain the vertical flexibility of the chain 10 in a direction normal to the supporting deck while at the same time the universal link 22 provides for horizontal flexibility in the direction parallel to the deck so that the chain can flex or bend at spaced apart points intermediate of the flight sections 18 in order that the conveyor chain 10 can negotiate curves in the decks according to positioning of the different portions of a mining machine, a loader, or the like, requiring a variable angular relationship of the decks.

The particular design of the universal link is not critical and other types of universal link can be substituted for the one described, as long as such links maintain the desired flexibility in both directions relative to the deck, without departing from the principles of this invention.

Operation of the conveyor chain 10 of this invention is entirely conventional as regards the orbital motion of the chain, along a deck surface, about a drive sprocket and roller at one end of the orbit and a roller or idler sprocket at the other end of the orbit with bending or flexing of the chain around the sprocket, on axes parallel to the deck, taking place on the pins 16 in a well known manner. The flight pins 20 also give the same kind of flexibility for passing the flights and chain links around the sprockets or rollers as the case may be. As regards horizontal flexing or bending of the chain in a direction parallel to the plane of the deck supporting the flights, the action is that shown in FIG. 3 with bending taking place about the pin 28 at one or more points remote from the flight sections 18 rather than at points immediately adjacent to the flight sections 18 as in chains of the prior art. It is to be seen that with the bending in a direction parallel to the deck taking place only at a single point between each pair of flight sections 18 and especially when those points are spaced a considerable distance from the flight section 18, on either side thereof, the positioning of the flight section 18 normal to the direction of motion will be much more stable and better controlled with less stress on the universal joint pin 28 than could be expected when the universal link was immediately adjacent each side of the flight section 18. Such control of the angular relationship between flight sections results in a much more smoothly operating chain with considerably less wear and shock loading on the various elements of the chain.

Further advantages resident in the conveyor chain of this invention are to be found in the 50 percent reduction in the number of universal links in a chain of given length which is important since the universal links are considerably more expensive than the roller links which will be used in their stead.

It is to be noted that more than one universal link 22 can be used between a pair of flight sections 18 in cases where a greater amount of flexibility parallel to the deck is desirable as in a flight conveyor operating around short radius curves in the conveyor deck. The principles of this invention would then dictate that at least one roller link 12 and/or connecting link 14 be used between successive universal links 22 as well as between a flight section 18 and the nearest universal link 22, so that the points of horizontal flexibility are always remote from the flight members.

It is to be further noted that the connecting links and universal links are the most rapidly wearing parts of any chain of this design and with the intermediate positioning of the universal link as applied to this invention it is possible to replace the connecting links and universal links while retaining the welded unit construction of the flight section 18 with the roller links 13 and thus increase the life of the chain at a relatively smaller cost compared to that possible where the universal links are a part of the welded flight units as is common in prior art chains of the same general type.

Yet another advantage of the intermediate positioning of the universal links resides in the freedom to choose the orientation of the universal link to provide that sprocket tooth driving force shall be applied to the desired (male or female) member of the universal link according to the design of the universal. Such choice is not possible with universals connected directly to the flights as in prior art chains because successive universals must be reversed when connected directly to the flights.

A preferred embodiment of the conveyor chain of this invention having hereinabove been described and illustrated it is to be realized that variations in the application of these principles are envisioned and are to be expected. It is therefore respectfully requested that this invention by interpreted as broadly as possible and limited only by the scope of the claims appended hereto.

What is claimed is:

1. An endless flight conveyor movable through a closed orbital path comprising: a plurality of conveying members spaced along said orbital path and extending transversely outwardly therefrom: a serial plurality of links extending between each two adjacent ones of said conveying members and along said path; at least some of said pluralities of links including a majority of first links and at least one other link; each of said some of said pluralities of links having sequential ones of said first links connected to each other and to said adjacent ones of said conveying members to pivotally move relative to each other only about axes extending generally in the same transverse direction as said conveying members; each of said other links being pivotally connected between two of said first links to pivotally move relative to said two of said first links cooperable therewith about axes extending substantially in the same transverse direction as said conveying member, and each of said other links having portions connected to each other to pivot about axes extending transversely outwardly from a portion of said path adjacent thereto and transversely of said first mentioned axes.

2. A conveyor chain as specified in claim 1 wherein each of said pluralities of links include a majority of said first links and at least one of said other links.

3. A conveyor chain as specified in claim 1 wherein each of said some of said pluralities of links includes only one of said other links.

4. A conveyor chain as specified in claim 1 wherein each of said some of said pluralities of links includes at least two of said other links.

5. A conveyor chain as specified in claim 2 wherein each of said pluralities of links includes only one of said other links.

6. A conveyor chain as specified in claim 2 wherein each of said pluralities of links includes at least two of said other links.

* * * * *